Patented Apr. 13, 1954

2,675,364

UNITED STATES PATENT OFFICE 2,675,364

ACRYLONITRILE POLYMER SOLUTIONS CONTAINING MORPHOLINE DERIVATIVES

Robert C. Harrington, Jr., Kingsport, Tenn., assignor to Eastman Kodak Company, Rochester, N. Y., a corporation of New Jersey No Drawing. Application November 8, 1951, Serial No. 255,550

7 Claims. (Cl. 260—30.4)

This invention relates to a new composition of matter comprising polyacrylonitrile (polymerized vinyl cyanide), and copolymers, interpolymers, and graft polymers of polyacrylonitrile in solution in, or plasticized with, compounds selected from the group consisting of phosphoryl morpholine, thionyl morpholine and thiophosphoryl morpholine.

The invention also relates to shaped articles produced from polyacrylonitrile polymers incorporated with these compounds and to methods of making such articles.

Since polymers of acrylonitrile, including the homopolymers, graft polymers, interpolymers, and copolymers thereof, are known to possess many desirable chemical and physical properties, such as insolubility in the common organic solvents, including acetone, methanol, ethanol, ethyl ether, ethyl acetate, benzene, toluene, ethylene dichloride, etc., insensitivity to these solvents, and unusual toughness and moisture regaining properties, many attempts have been made to find solvents which could be utilized to spin these polymers into fibers. Inorganic salts, such as zinc chloride, lithium bromide and sodium sulfocyanide, have previously been proposed for this purpose. However, fibers spun by extrusion of these solutions into coagulating baths which are non-solvents for polyacrylonitrile or copolymers or acrylonitrile, such as water, dilute acid solutions, glycerol, etc., usually contain large amounts of these salts. The fibers containing these salts are not uniform and possess poor physical properties, and even where it is possible to eliminate these salts from the fiber, the fibers become weak, spongy or brittle. Some of these salts have the further undesirable property of causing the fibers to have a tacky consistency, which results in the individual filaments sticking together to give an extremely brittle, inflexible fiber having many of the characteristics of a monofilament. U. S. Patents 2,404,713 and 2,404,728 propose to use various organic compounds as solvents for polymers of acrylonitrile and show how solutions of these polymers can be used to spin fibers which do not possess the undesirable properties that result from the use of inorganic salts.

I have now discovered that polymers of acrylonitrile, where the polymer molecule contains a major proportion, and preferably at least 80% of polyacrylonitrile, can be incorporated with, as in solution, phosphoryl morpholine, thionyl morpholine, or thiophosphoryl morpholine, and that these solutions can be used to advantage in the preparation of fibers, films, molded objects, and other shaped articles. These solvents are cheaply and easily prepared from readily available raw materials and are stable when heated to 75–150° C. and maintained at this temperature for as long as 30 minutes. They also show good shelf life in storage.

It is an object of my invention to provide a new class of solvents for polyacrylonitrile, and copolymers, interpolymers and graft polymers of polyacrylonitrile in which a major proportion, and preferably at least 80% of the polymer is polyacrylonitrile. A further object of the invention is to provide solutions of polymers of acrylonitrile in these new solvents, which solutions can be used advantageously in the wet and dry spinning of fibers and in the formation of other shaped articles. Still another object of the invention is to provide improved methods of forming synthetic filaments, molded articles and the like from acrylonitrile.

These and other objects of the invention will be more apparent after consideration of the following specification.

The solvents and plasticizers with which the invention is concerned include the following group of compounds:

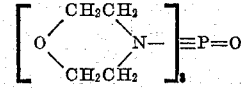

Phosphoryl morpholine

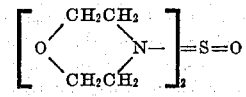

Thionyl morpholine

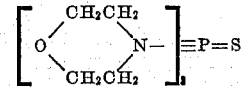

Thiophosphoryl morpholine

These compounds are prepared as follows:

*Example I*

A total of 153 gms. (1 mole) of $POCl_3$ is placed in a 3-neck flask fitted with a condenser and stirrer. To this, 261 gms. (3 moles) of morpholine are added slowly with vigorous stirring of the reaction mixture which is kept at a temperature not higher than 10° C. during this time. The solid product which is formed is heated to its melting point, and held there for 15–20 minutes to complete the evolution of HCl. At the end of this time, the reaction product is recrystallized from ethyl alcohol, and needles of fairly pure phosphoryl morpholine melting at 164–165° C. are obtained. This compound is an excellent solvent for acrylonitrile polymers and copolymers of the classes previously described.

Example II

One hundred and nineteen grams (1 mole) of thionyl chloride is dissolved in 500 ml. of ethylene dichloride and added to a well-cooled 3-neck flask fitted with a stirrer and condenser. A solution of 179 gms. (2 moles) of morpholine dissolved in 250 ml. of ethylene dichloride is then added slowly to the thionyl chloride solution, the reaction mixture meanwhile being held at 0–5° C. After the morpholine solution has all been added, the mixture is warmed to about 40° C. and stirred to remove any excess HCl. The solid formed during the reaction is then filtered and recrystallized from a benzene-alcohol mixture. Crystals of reasonably pure thionyl morpholine melting at 171–172° C. are obtained. This compound is a solvent for the classes of polymers and copolymers previously described.

Example III

A total of 169 gms. (1 mole) of thiophosphoryl chloride is added slowly to 261 gms. (3 moles) of chilled morpholine placed in a 3-neck flask having an efficient stirrer and reflux condenser. In this reaction, it is necessary to warm the reaction mixture in order to complete the addition of PSCl₃, since a solid is soon formed in the reaction vessel. This is done carefully, and the solid obtained is further warmed to remove HCl. This solid compound is recrystallized from alcohol to give white needles of fairly pure thiophosphoryl morpholine melting at 171–173° C. This compound is an excellent solvent for the classes of polymers and copolymers previously described.

It is apparent that the preparation of the compounds of the above examples is quite simple, since it is only necessary to react morpholine with POCl₃, PSCl₃ or SOCl₂ with morpholine in the cold, heat the resulting mixture for about 15 minutes, and then purify by one recrystallization. These compounds are inexpensive and easily obtained on a normal market. Ordinarily, most compounds are made by a more involved process of reactions and subsequent distillations, and even then may not be of high purity. However, the compounds disclosed herein as solvents show good solvent power with little purification.

The polymer solutions are prepared by adding the powdered polymer or copolymer to the warm liquid solvent and stirring until solution is complete. Alternatively, the solvent and the polymer can be intimately mixed by using a Waring Blender, mixing rolls or the like, followed by heating, preferably under pressure. The temperature to which the solvent mixture is heated may vary from about 100° C. to 250° C. depending on the solvent. Polymer solutions intended for various uses and having different viscosities and other characteristics may be prepared by varying the solids content of the solutions.

Polyacrylonitrile solutions prepared by using the solvents set forth above form filaments when extruded through a filament forming orifice into a suitable coagulating medium in either a wet or dry process. As is well known, these processes involve the use of evaporative or solvent exhausting media such as alcohol, steam, air, or others which are well known in the art.

Examples of the use of solutions of polyacrylonitrile in the new solvents for making filaments are as follows:

Example A

About 10 parts by weight of powdered polyacrylonitrile are stirred into 100 parts of phosphoryl morpholine which had been heated to about 170° C. Any temperature from the melting point of the solvent up to about 225° C. would be satisfactory. A smooth, pourable solution results.

This solution is extruded at about 200° C. through a spinneret into a coagulating bath of isopropanol maintained at about 25° C. to form a filament or thread of polymeric acrylonitrile. Such filaments may be given such further known physical treatment such as stretching, treatment with various liquids, and the like, as may be desired.

Films are produced when the hot solution is poured onto a warm surface, such as glass, followed by immersion in a hot solvent for the morpholine compound, for example at about 10° C.

Other examples could be given using the other compounds set forth in Examples I–III, but since they are used in the same manner as set forth in Example A, it would be repetitious to include them herein. It is to be understood that the examples which have been set forth are given merely in an illustrative sense, as the invention is not limited thereto.

Polyacrylonitrile solutions made in accordance with the invention can also be extruded as tapes, bars, rods and other desired configurations.

After use of the solvents of the invention, they may be readily recovered from the coagulating medium. Where the solvent is a solid normally, it can be crystallized out of the medium on cooling, and can be separated as by filtration or centrifuging for re-use in the process. Due to their stability to heat, the solvents of this class are left substantially unchanged as the residue after such distillation. This ease of recovery, by permitting re-use, renders this class of solvents quite economical.

Molded articles may be formed from the solutions described above by the use of any suitable molding procedure known to the art.

The solvents which are the subject matter of my invention have been found to be highly useful and advantageous over many previously known solvents, particularly because of their improved stability, ease of recovery, ease of production, low cost, good shelf life, and ability to withstand relatively high temperatures without noticeable degradation.

Various types of modifying agents can be added to the solutions made as described above, for example, proteins, cellulose organic acid esters, cellulose ethers, polyamides, polyesters, vinylpolymers, etc.

I claim:

1. As a new composition of matter, a polymer of acrylonitrile containing in the polymer molecule at least a major proportion by weight of poly-acrylonitrile, incorporated with a compound selected from the group consisting of phosphoryl morpholine, thionyl morpholine, and thiophosphoryl morpholine.

2. As a new composition of matter, a polymer of acrylonitrile containing in the polymer molecule at least a major proportion by weight of poly-acrylonitrile, dissolved in a compound selected from the group consisting of phosphoryl morpholine, thionyl morpholine, and thiophosphoryl morpholine.

3. As a new composition of matter, a polymer of acrylonitrile containing in the polymer molecule at least 80% by weight of poly-acrylonitrile dissolved in a solvent selected from the group consisting of phosphoryl morpholine, thionyl morpholine, and thiophosphoryl morpholine.

4. A composition of matter according to claim 3 wherein the solvent is phosphoryl morpholine.

5. A composition of matter according to claim 3 wherein the solvent is thionyl morpholine.

6. A composition of matter according to claim 3 wherein the solvent is thiophosphoryl morpholine.

7. A plasticizer for acrylonitrile polymers containing in the polymer molecule at least a major proportion of poly-acrylonitrile, comprising a compound selected from the group consisting of phosphoryl morpholine, thionyl morpholine and thiophosphoryl morpholine.

No references cited.